US010547540B2

(12) United States Patent
Maskalik et al.

(10) Patent No.: US 10,547,540 B2
(45) Date of Patent: Jan. 28, 2020

(54) ROUTING OPTIMIZATION FOR INTER-CLOUD CONNECTIVITY

(71) Applicant: VMware, Inc., Palo Alto, CA (US)

(72) Inventors: Serge Maskalik, Los Gatos, CA (US);
Weiqing Wu, Cupertino, CA (US);
Debashis Basak, San Jose, CA (US);
Sachin Thakkar, San Jose, CA (US);
Allwyn Sequeira, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 397 days.

(21) Appl. No.: 14/981,436

(22) Filed: Dec. 28, 2015

(65) Prior Publication Data

US 2017/0063674 A1 Mar. 2, 2017

Related U.S. Application Data

(60) Provisional application No. 62/211,783, filed on Aug. 29, 2015.

(51) Int. Cl.
*H04L 29/06* (2006.01)
*H04L 12/721* (2013.01)
*H04L 29/08* (2006.01)
*H04L 12/66* (2006.01)
*H04L 12/813* (2013.01)

(52) U.S. Cl.
CPC .............. *H04L 45/38* (2013.01); *H04L 12/66* (2013.01); *H04L 47/20* (2013.01); *H04L 63/0272* (2013.01); *H04L 63/166* (2013.01); *H04L 67/06* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 8,516,158 B1* | 8/2013 | Wu | H04L 69/04 709/223 |
| 8,670,326 B1* | 3/2014 | Balasubramanian | H04L 45/22 370/238 |
| 2003/0177396 A1* | 9/2003 | Bartlett | H04L 12/4641 726/15 |
| 2009/0092137 A1* | 4/2009 | Haigh | H04L 12/4641 370/392 |
| 2011/0032833 A1* | 2/2011 | Zhang | H04L 45/70 370/252 |
| 2015/0036684 A1* | 2/2015 | Modi | H04L 45/22 370/389 |
| 2015/0096011 A1 | 4/2015 | Watt | |
| 2015/0113629 A1 | 4/2015 | Park et al. | |
| 2015/0172204 A1* | 6/2015 | Anderson | H04L 47/70 709/224 |
| 2015/0309894 A1* | 10/2015 | Zhou | G06F 11/2023 714/4.11 |
| 2016/0080501 A1* | 3/2016 | Freimuth | H04L 67/141 709/228 |

* cited by examiner

*Primary Examiner* — Natisha D Cox
(74) *Attorney, Agent, or Firm* — Loza & Loza, LLP

(57) ABSTRACT

A cloud computing system may include multiple cloud data centers. A gateway may establish connections between a cloud providers' multiple data centers using knowledge about the types of applications workloads executing within the cloud computing system, and may be further based on determines policies indicating priorities for routing traffic for the application workloads.

16 Claims, 8 Drawing Sheets

ROUTING OPTIMIZATION FOR INTER-CLOUD CONNECTIVITY

CROSS-REFERENCE TO RELATED APPLICATION(S)

This application claims the benefit of U.S. Provisional Patent Application No. 62/211,783, filed Aug. 29, 2015, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud Director® cloud architecture software, AmazonEC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

SUMMARY

Embodiments of the present disclosure provide a method, a computer-readable storage medium, and a computer system for optimizing connectivity between data centers in a cloud computing system. In one embodiment, the method includes determining a type of an application workload flow executing for a tenant from a first data center and a second data center of the cloud computing system, and determining a policy indicating a priority for the workload flow from the first data center and the second data center. The method further includes establishing a path-optimized connection through a wide area network (WAN) between a first gateway of a first data center and a second gateway of a second data center for the application workload executing in the first data center based on the determined policy, and forwarding application packets of the application workload flow from the first gateway of in the first data center to the second gateway in the second data center over the path-optimized connection.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
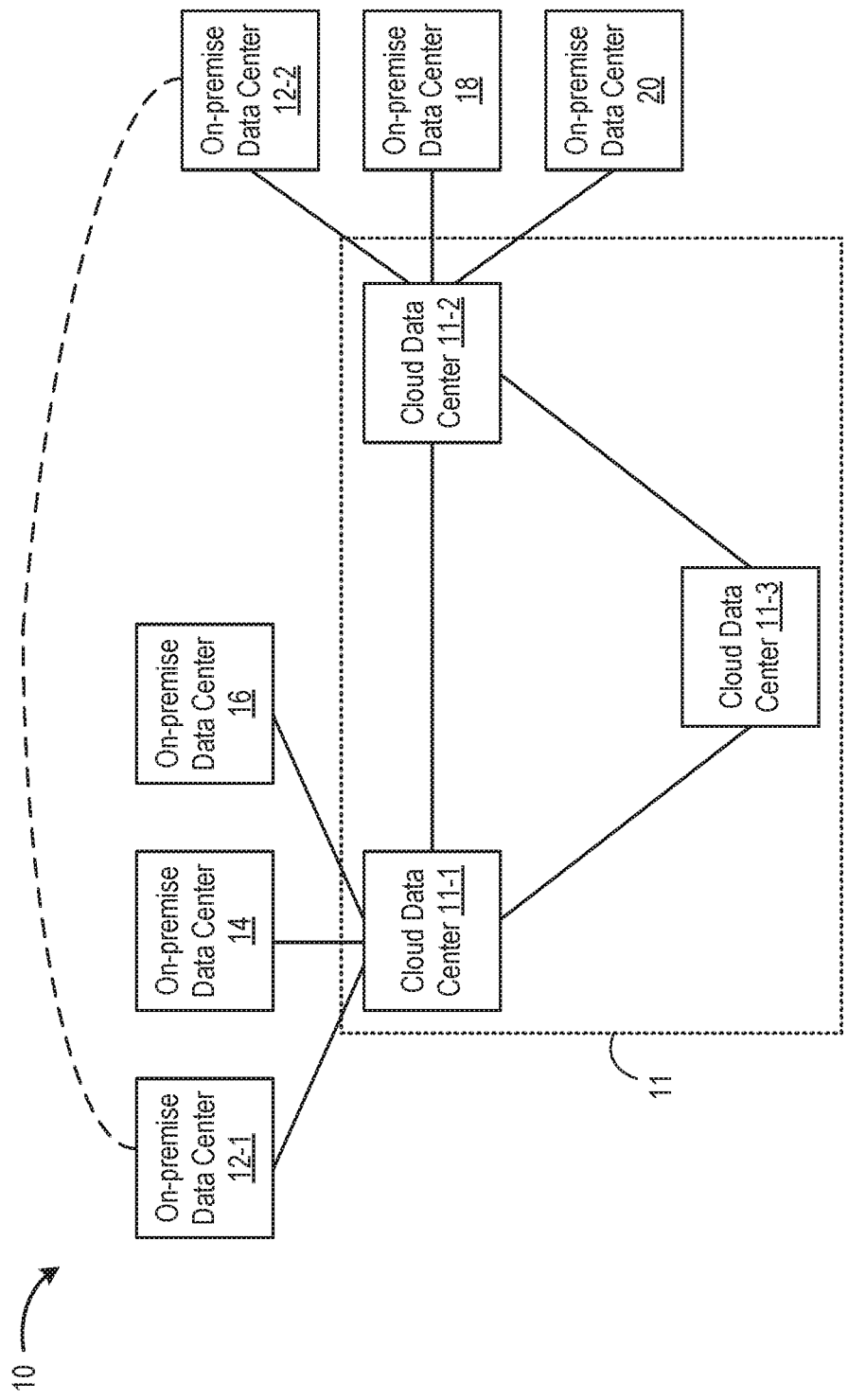
FIG. 1 is a block diagram of a hybrid cloud computing system in which one or more embodiments of the present disclosure may be utilized.

FIG. 1 is a block diagram of a hybrid cloud computing system 10 in which one or more embodiments of the present disclosure may be utilized. Hybrid cloud computing system 10 includes a plurality of virtualized computing systems implemented within on-premise data centers and a cloud computing system 11. In the example of FIG. 1, hybrid cloud computing system 10 includes on-premise data centers 12-1, 12-2, 14, 16, 18, and 20, each of which is coupled to cloud computing system 11. In the example of FIG. 1, cloud computing system 11 includes cloud data centers 11-1, 11-2, and 11-3. The number of cloud data centers and the number of on-premise data centers shown in FIG. 1 is just one example. In general, there can be any number of on-premise data centers coupled to cloud computing system 11, which can include any number of cloud data centers.

Hybrid cloud computing system 100 is configured to provide a common platform for managing and executing virtual workloads seamlessly between on-premise data centers and cloud data centers. In one embodiment, an on-premise data center may be a data center controlled and administrated by a particular enterprise or business organization, while cloud data centers of cloud computing system 11 may be operated by a cloud computing service provider and exposed as a service available to account holders, such as the particular enterprise in addition to other enterprises. As such, on-premise data center(s) of an enterprise may sometimes be referred to as a "private" cloud, and cloud computing system 11 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

In the example of FIG. 1, on-premise data centers 12-1, 14, and 16 are communicatively coupled to cloud data center 11-1, and on-premise data centers 12-2, 18, and 20 are communicatively coupled to cloud data center 11-2. A given on-premise data center can be coupled to one or more cloud data centers through one or more network connections, including direct network connections (e.g., private connections) and/or public network connections (e.g., public Internet connections). On-premise data centers 12-1 and 12-2 can be controlled and administered by the same enterprise, whereas on-premise data centers 14, 16, 18, and 20 can be controlled and administered by separate enterprises. In some embodiments, on-premise data center 12-1 can be communicatively coupled to on-premise data center 12-2 through one or more network connections. That is, a given enterprise's private cloud can include a plurality of on-premise data centers with network connectivity therebetween. Likewise, cloud data centers 11-1, 11-2, and 11-3 can include one or more network connections to support network connectivity therebetween.

In some embodiments, cloud data centers 11-1, 11-2, and 11-3 are located to support particular geographic regions. Thus, on-premise data centers 12-1, 14, and 16 can be located in one geographic region served by cloud data center 11-1. On-premise data centers 12-2, 18, and 20 can be located in another geographic region served by cloud data center 11-2. Cloud data center 11-3 can serve yet another geographic region having one or more on-premise data centers (not shown).

Figure 2:
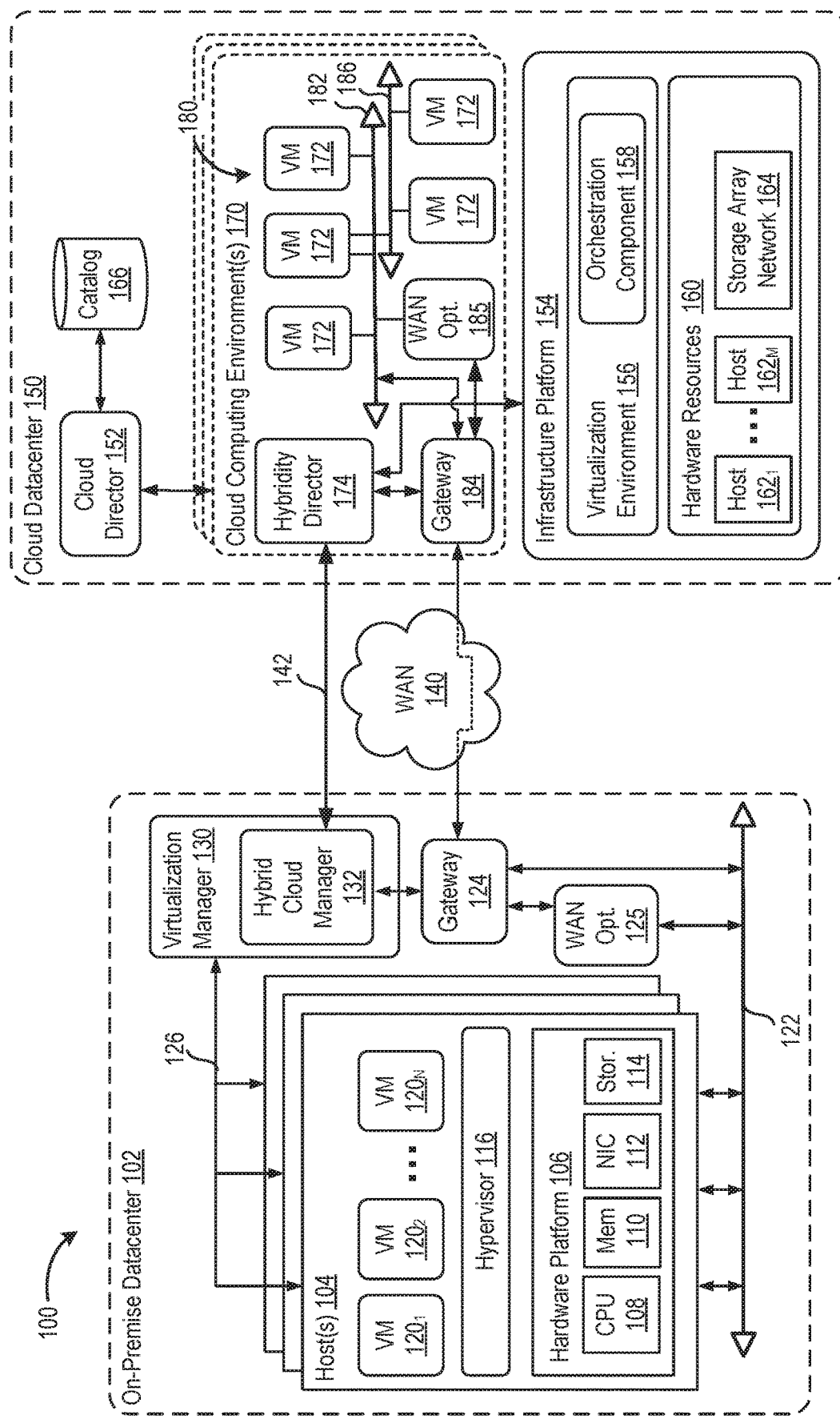
FIG. 2 is a block diagram of a portion of a hybrid cloud computing system in which one or more embodiments of the present disclosure may be utilized.

FIG. 2 is a block diagram of a hybrid cloud computing system 100 in which one or more embodiments of the present disclosure may be utilized. Hybrid cloud computing system 100 includes a virtualized computing system implementing an on-premise data center 102 and a virtualized computing system implementing a cloud data center 150. Hybrid cloud computing system 100 is a subset of hybrid cloud computing system 10 with one on-premise data center and one cloud data center. It is to be understood that each on-premise data center coupled to a cloud computing system can be configured similarly to on-premise data center 102, and each cloud data center that is part of a cloud computing system can be configured similarly to cloud data center 150. In this regard, on-premise data center 102 can be one of on-premise data centers 12-1, 12-2, 14, 16, 18, 20, and cloud data center 150 can be one of cloud data centers 11-1, 11-2, and 11-3 shown in FIG. 1.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines 120₁ to 120_N (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 2 as virtualization manager 130) that may communicate to the plurality of hosts 104 via a network, sometimes referred to as a management network 126. In one embodiment, virtualization manager 130 is a computer program that resides and executes in a central server, which may reside in on-premise data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external wide area network (WAN) 140 (e.g., the public Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over WAN 140. As described further herein, gateway 124 can optimize connectivity between on-premise data center 102 and cloud data center 150 through WAN 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 2, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing on-premise data center 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 2, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 2, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to WAN 140 (e.g., the public Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over WAN 140 with another VPN endpoint, such as gateway 124 within on-premise data center 102. In other embodiments, gateway 184 may be configured to connect to communicate with on-premise data center 102 using a high-throughput, dedicated link (depicted as a direct connect 142) between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 2.

While FIG. 2 depicts communication between on-premise gateway 124 and cloud-side gateway 184 for illustration purposes, it should be recognized that communication between multiple on-premise gateways 124 and cloud-side gateways 184 may be used. Furthermore, while FIG. 2 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

In an embodiment, on-premise data center 102 includes a WAN optimization appliance (WAN optimizer 125). Similarly, cloud data center 150 can include a WAN optimization appliance (WAN optimizer 185) in one or more cloud computing environments 170. WAN optimization refers to a suite of techniques used to increase data-transfer efficiencies across WAN 140. In some cases, WAN optimization may be set up in network topologies having a private data center as one end point and another private data center as the other end point. However, such cases assume the same organization has complete control and management of both end points (data centers), in contrast to a hybrid cloud configuration where the organization is one of many tenants in the other end point.

In some embodiments, each WAN optimizer 125 and 185 can be a physical appliance implemented in hardware or a virtual appliance implemented within a VM. WAN optimizer 125 is coupled to gateway 124. WAN optimizer 185 is coupled to gateway 184. As described below, gateways 124 and 184 are configured to optimize connectivity through WAN 140 and establish a path-optimized connection for an application based on path performance. The path-optimized connection can encapsulate the application traffic for the application so that the path-optimization is transparent to the application. Typically, a WAN optimizer is coupled between the application and the WAN. However, in hybrid cloud computing system 110, gateways 124 and 184 are performing an independent optimization that encapsulates the application traffic. Thus, it would be ineffective to implement the typical configuration of a WAN optimizer coupled between the gateway and WAN 140. As described below, the encapsulated application traffic on the path-optimized connection can be encrypted and can include a modified Internet Protocol (IP) flow for path optimization. This optimization performed by the gateways would conflict with optimization performed by a WAN optimizer. According, in embodiments, gateway 124 provides an interface to WAN optimizer 125 and gateway 184 provides an interface to WAN optimizer 185. Gateways 124 and 184 forward application traffic through WAN optimizers 125 and 185, respectively, prior to performing their own optimization. Gateways 124 and 184 can provide a virtual WAN interface to WAN optimizer 125 and WAN optimizer 185, respectively, to mimic a connection to WAN 140. This allows WAN optimizers 125 and 185 to function without modification, allowing the use of various commercially available WAN optimizers.

Figure 3:
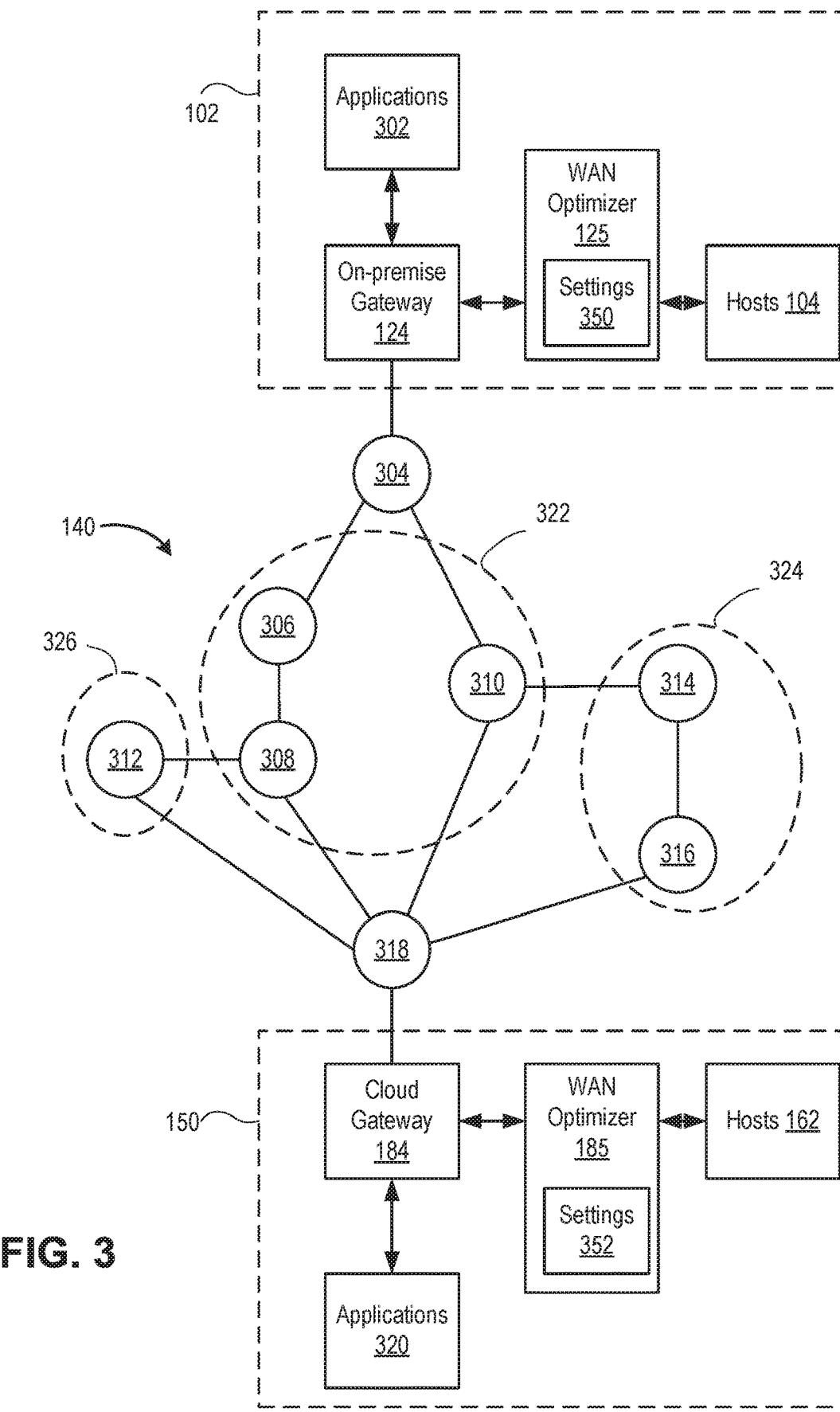
FIG. 3 is a block diagram depicting a logical view of hybrid cloud computing system of FIG. 2 according to embodiments.

FIG. 3 is a block diagram depicting a logical view of hybrid cloud computing system 100 according to embodiments. Various applications 302 execute within on-premise data center 102 and are configured for communication with on-premise gateway 124 to obtain access to WAN 140. Applications 302 can include any software application, process, thread, or the like executing on a computer (e.g., virtual or physical) within on-premise data center 102. On-premise gateway 124 is also coupled to WAN optimizer 125. Likewise, various applications 320 execute within cloud data center 150 and are configured for communication with cloud gateway 184 to obtain access to WAN 140. Applications can include any software application, process, thread, or the like executing on a computer (e.g., virtual or physical) within cloud data center 150. Cloud gateway 184 is also coupled to WAN optimizer 185.

Some applications 302 in on-premise data center 102 can cooperate with other applications 320 in cloud data center 150. As such, some applications 302 can communicate with other applications 320 through WAN 140. For example, a VM migration process executing within on-premise data center 102 can cooperate with a VM migration process executing within cloud data center 150 to migrate a VM from on-premise data center 102 to cloud data center 150 over WAN 140. VM migration is merely one example of a myriad of applications designed to cooperate through communication over WAN 140. To initiate communication, an application 302 can communicate with on-premise gateway 124 to establish a connection through WAN 140 between on-premise gateway 124 and cloud gateway 184. Alternatively, an application 302 can communicate with cloud gateway 184 to establish a connection through WAN 140 between on-premise gateway 124 and cloud gateway 184.

WAN 140 includes a plurality of communication nodes. Each communication node can include one or more network devices, such as routers, switches, and the like. Different sets of communication nodes can be managed by different service providers, such as network service providers (NSPs), Internet service providers (ISPs), and the like. In the example of FIG. 3, WAN 140 includes communication nodes 304 through 318. Communication nodes 306, 308, and 310 are controlled by a service provider 322. Communication nodes 314 and 316 are controlled by a service provider 324. Communication node 312 is controlled by a service provider 326. Communication node 304 comprises an edge node coupled to on-premise gateway 124 and can be controlled by a service provider or by the enterprise that controls on-premise data center 102. Communication node 318 comprises an edge node coupled to cloud gateway 184 and can be controlled by a service provider or by the cloud service provider that controls cloud data center 150.

Service providers 322, 324, and 326 are typically third parties with respect to the enterprise controlling on-premise data center 102 and the cloud service provider controlling cloud data center 150. As such, neither the enterprise nor the cloud service provider has control over the communication nodes in WAN 140, other than potentially the edge nodes 304 and 318. As such, neither the enterprise nor the cloud service provider can control the path through WAN 140 for a connection between on-premise gateway 124 and cloud gateway 184. Service providers 322, 324, and 326 can implement one or more traffic management schemes to control traffic flow through their communication nodes. Example traffic management schemes include traffic shaping, traffic policing, and the like. Some traffic management schemes are content-based and can manage traffic according to the different applications that generate the traffic. Other traffic management schemes are route-based and can manage traffic according to different internet protocol (IP) flows. An IP flow is defined by an IP flow tuple of source IP address, source port, destination IP address, and destination port. The traffic management schemes implemented by service providers 322, 324, and 326 can affect the performance (e.g., latency, data rate, etc.) of connections between on-premise gateway 124 and cloud gateway 184. In some cases, the performance of an arbitrary connection through WAN 140 can less than that required by a given application. For example, a VM migration process can time-out or otherwise fail if the latency of a connection exceeds a particular threshold. While packet encryption (e.g., VPN) can be used to avoid content-based traffic management, such encryption does not avoid route-based traffic management based on IP flow.

Figures 4, 5:
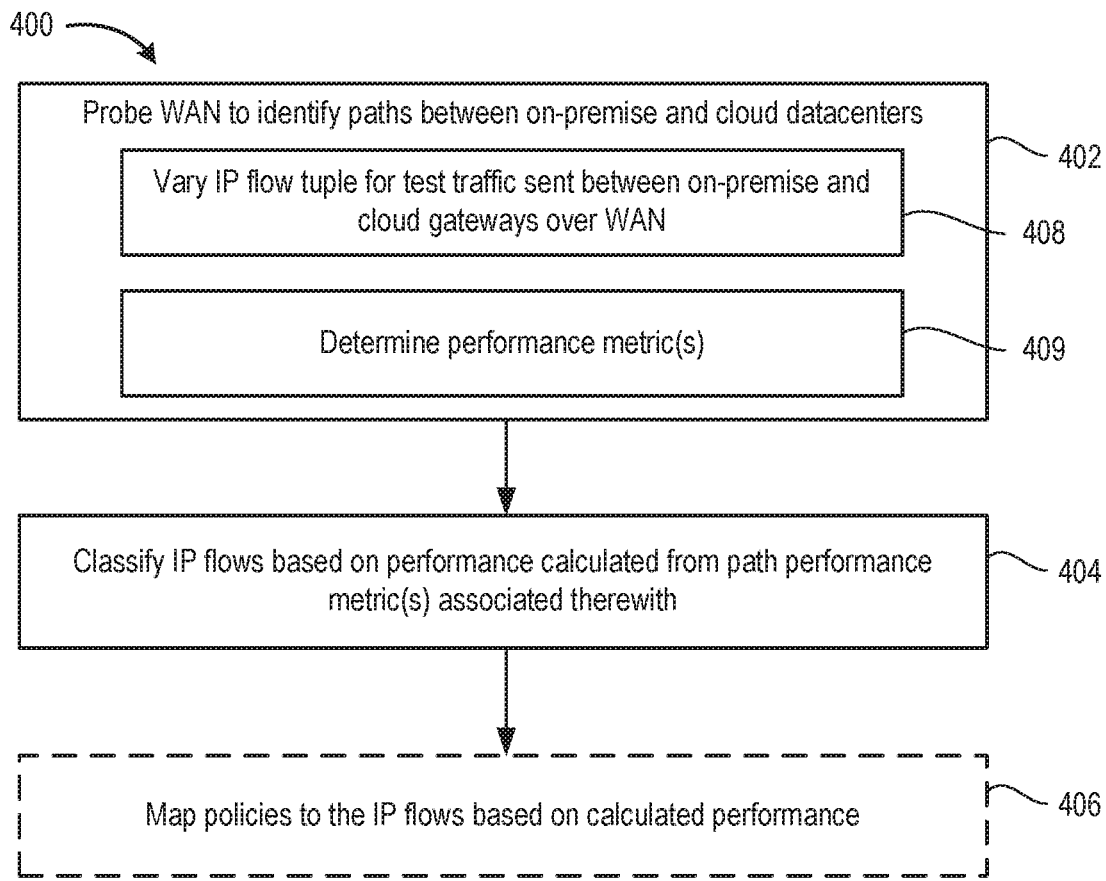
FIG. 4 is a flow diagram depicting a method of identifying and classifying paths in a wide area network (WAN) according to embodiments.
FIG. 5 illustrates an example database that can be maintained by a gateway for identifying and classifying paths in a WAN according to embodiments.

In embodiments, gateways 124 and 184 are configured to optimize connectivity through WAN 140. FIG. 4 is a flow diagram depicting a method 400 of identifying and classifying paths in WAN 140 according to embodiments. Method 400 can be performed by a gateway, such as on-premise gateway 124 or cloud gateway 184. For purposes of clarity by example, method 400 is described as being performed by on-premise gateway 124.

Method 400 begins at step 402, where on-premise gateway 124 probes WAN 140 to identify paths between on-premise data center 102 and cloud data center 150. At any given time, WAN 140 can route packets (generally referred to as traffic) between on-premise gateway 124 and cloud gateway 184 through different sets of communication nodes. A path through WAN 140 includes a particular set of communication nodes. In an embodiment, on-premise gateway 124 can send and receive test traffic (test packets) to and from cloud gateway 184 to identify different paths. The test traffic can include different IP flows in an attempt to identify different paths through WAN 140. As discussed above, an IP flow is defined by an IP flow tuple. At step 408, on-premise gateway 124 can vary the IP flow tuple of the test traffic sent between on-premise gateway 1224 and cloud gateway 184 over WAN 140. In some embodiments, one or more of the source IP address, source port, destination IP address, and destination port can be varied for the test traffic. At a given time, one IP flow can cause traffic to flow through one path, and another IP flow can cause traffic to flow through another path. Traffic management schemes within WAN 140 are generally controlled by a network provider and may be outside the control of the organizations managing the on-premise and cloud data centers. For example, one traffic management scheme within WAN 140 may shape traffic based on port numbers used in the flow. In this example, on-premise gateway 124 varies the port numbers (source and/or destination) of the test traffic, which cause different routing paths to form within WAN 140 (as a result of the traffic management schemes). A set of IP flows can be tested by varying the IP flow tuple of the test traffic to identify a set of paths through WAN 140. Each path in the resulting set of paths can be associated with one or more IP flows. Conversely, each IP flow in the set of tested IP flows can be associated with one or more paths. At step 409, one or more performance metrics can be determined for each resulting path. Example performance metrics include latency and data rate.

In the example of FIG. 3, there is a path comprising nodes 304, 306, 308, and 318; another path comprising nodes 304, 310, and 318; another path comprising nodes 304, 310, 314, 316, and 318; and another path comprising nodes 304, 306, 308, 312, and 318. Each of the paths can exhibit different performance (e.g., different latency, different data rates, etc.). On-premise gateway 124 can send and receive test traffic using a set of IP flows to be tested. One or more of the IP flows can result in the test traffic traversing the path comprising nodes 304, 306, 308, and 318. One or more other of the IP flows can result in the test traffic traversing the path comprising nodes 304, 310, and 318. Other IP flows can result in the test traffic traversing the other paths. In this manner, different paths through WAN 140 can be identified and associated with the corresponding IP flow tuples.

At step 404, on-premise gateway 124 classifies the IP flows based on performance calculated from the determined performance metric(s) for the resulting paths. Performance metrics for one or more associated paths can be combined in various ways to compute an overall performance of a given IP flow. Thus, some IP flow can be classified as having higher performance, while other IP flows can be classified as having lower performance.

At optional step 406, on-premise gateway 124 can map different policies to the IP flows based on the calculated performance. Each policy can specify a certain level of performance. The policies can then be assigned to different types of application traffic either automatically by on-premise gateway 124, or specifically by an administrator. To facilitate automatic policy assignment, each policy can specify one or more constraints that need to be met before application traffic can be assigned that policy. The constraints can be based on various attributes, such as application traffic type, time of day, and the like.

FIG. 5 illustrates an example database 500 that can be maintained by on-premise gateway 124 according to embodiments. Database 500 includes a list of IP flows. For each IP flow, database 500 includes a performance associated with that IP flow. Database 500 can optionally include other information for each IP flow, such as which policies are mapped to each IP flow, which paths resulted from each IP flow, and the like. On-premise gateway 124 can repeatedly perform method 400 to maintain and update database 500 over time. Method 400 can be performed by any other gateway in a hybrid cloud computing system in a similar fashion.

Figure 6:
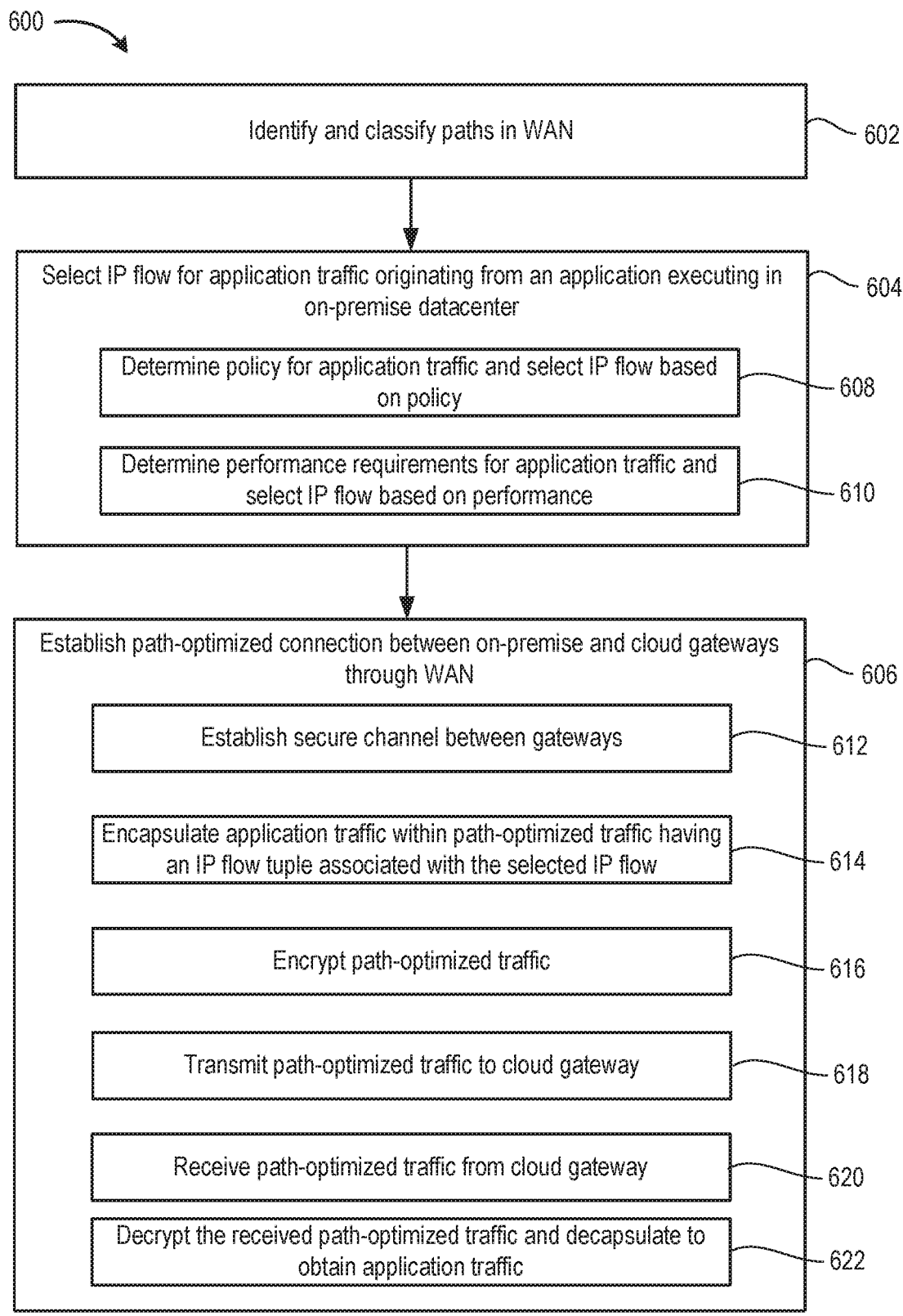
FIG. 6 is a flow diagram depicting a method of optimizing connectivity between data centers in a hybrid cloud computing system according to embodiments.

FIG. 6 is a flow diagram depicting a method 600 of optimizing connectivity between data centers in a hybrid cloud computing system according to embodiments. Method 600 is described as being performed by on-premise gateway 124, but can be performed by any other gateway within hybrid cloud computing system.

Method 600 begins at step 602, where on-premise gateway 124 identifies and classifies paths in WAN. For example, on-premise gateway 124 can perform method 400 described above to maintain database 500 described above. At step 604, on-premise gateway 124 selects an IP flow for application traffic originating from an application 302. For example, at step 608, on-premise gateway 124 can determine a policy for the application traffic and select an IP flow based on the determined policy. As noted above, an administrator can assign a policy to particular types of application traffic, or on-premise gateway 124 can automatically assign a policy to the application traffic. Alternatively, at step 610, on-premise gateway 124 can determine performance requirements of the application traffic and select an IP flow based on performance. That is, rather than using policies, application traffic can be assigned to a particular IP flow based on performance requirements.

At step 606, on-premise gateway 124 establishes a path-optimized connection between to cloud gateway 184 through WAN 140. A path-optimized connection is a connection selected for the application traffic based on performance or policy, as described above. Step 606 can include various sub-steps. At step 612, on-premise gateway 124 can establish a secure channel with cloud gateway 184 (e.g., a VPN connection). When establishing the secure channel, on-premise gateway 124 can communicate with cloud gateway 184 through WAN 140. On-premise gateway 124 can inform cloud gateway 184 of the IP flow to be used for the secure channel.

At step 614, on-premise gateway 124 can encapsulate the application traffic within path-optimized traffic having an IP flow tuple associated with the selected IP flow. At step 616, on-premise gateway 124 encrypts the path-optimized traffic in accordance with the parameters of the established secure channel. At step 618, on-premise gateway 124 transmits the path-optimized traffic to cloud gateway 184 over the secure channel. At step 620, on-premise gateway 124 receives path-optimized traffic from cloud gateway 184 over the secure channel. At step 622, on-premise gateway 124 decrypts the path-optimized traffic and decapsulates the path-optimized traffic obtain application traffic.

Figure 7:
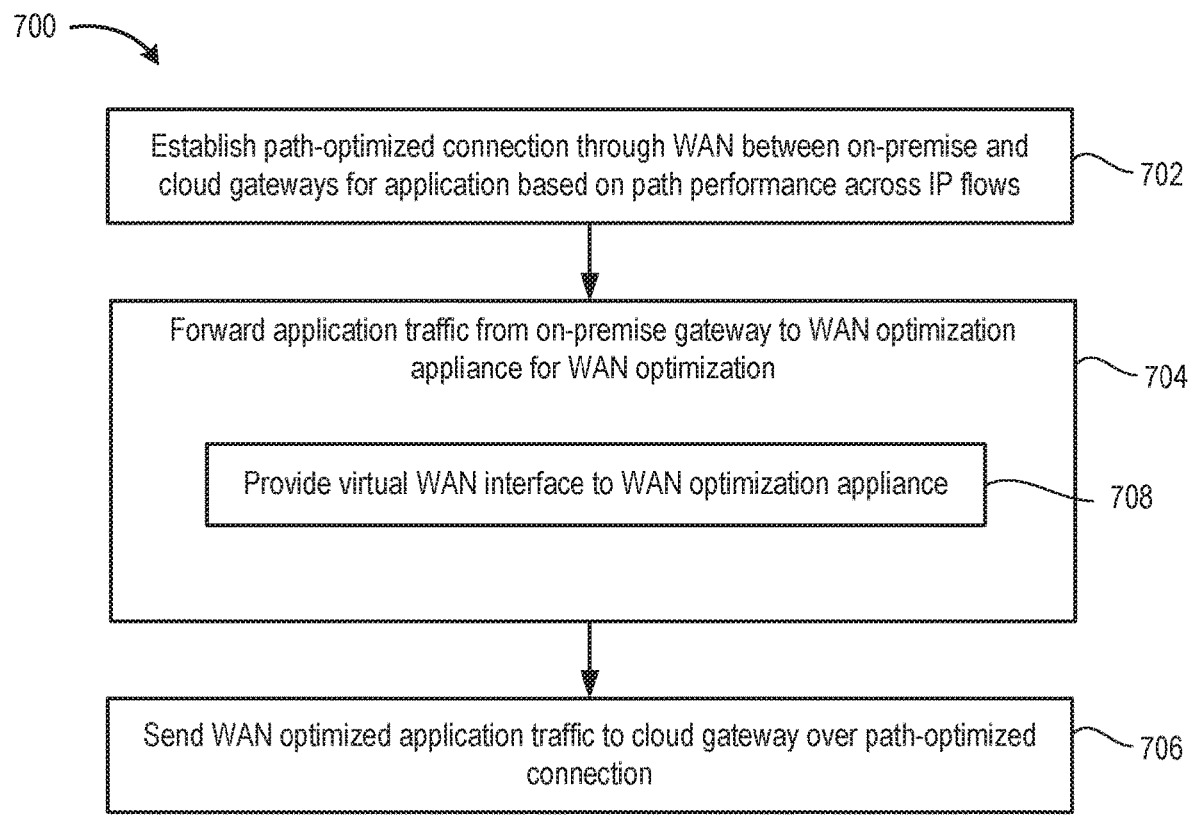
FIG. 7 is a flow diagram depicting another method of optimizing connectivity between data centers in a hybrid cloud computing system according to embodiments.

As discussed above, in some embodiments, on-premise gateway 124 can cooperate with WAN optimizer 125. Likewise, cloud gateway 184 can cooperate with WAN optimizer 185. FIG. 7 is a flow diagram of a method 700 of optimizing connectivity between data centers in a hybrid cloud computing system according to embodiments. Method 700 can be performed by a gateway, such as on-premise gateway 124. Method 700 begins at step 702, where on-premise gateway 124 establishes a path-optimized connection through WAN between on-premise and cloud gateways for an application based on path performance across a set of IP flows. On-premise gateway 124 can perform step 702 by performing methods 400 and 600 described above.

At step 704, on-premise gateway 124 forwards application traffic to WAN optimizer 125 for WAN optimization. At step 708, on-premise gateway 124 can provide a virtual WAN interface to WAN optimizer 125. The virtual WAN interface wraps the path-optimized connection and mimics a connection to WAN 140 for WAN optimizer 125. WAN optimizer 125 is configured to perform at least one WAN optimization on application traffic. Example WAN optimizations include deduplication, compression, latency optimization, caching, forward error correction, protocol spoofing, and traffic shaping. Deduplication attempts to eliminate the transfer of redundant data cross WAN 140 by replacing duplicate data with data references. Compression attempts to reduce the size of the application traffic by more efficiently representing certain data patterns using various compression techniques. Latency optimization can include transmission control protocol (TCP) optimizations, such as TCP window size scaling and the like. Caching includes storing recently used application data in memory. Forward error correction includes mitigating packet loss by adding loss-recovery packets to the application traffic. Protocol spoofing includes bundling multiple requests from an application into one request. Traffic shaping includes control data flow for specific applications. WAN optimizer 125 can perform these or other known WAN optimizations on the application traffic.

At step 706, on-premise gateway 124 sends WAN-optimized application traffic received from WAN optimizer 125 to cloud gateway 184 over the established path-optimized connection. Method 700 can be used to add separate WAN optimization to the application traffic in addition to the path optimization described herein. This allows deployment of a WAN optimizer alongside a gateway to perform a combination of optimizations on application traffic to be transmitted between data centers.

Returning to FIG. 2, in some embodiments, WAN optimizer 125 can be coupled to network 122 for communication with hosts 104. Likewise, WAN optimizer 185 can be coupled to network 182 for communication with VMs 172 executing on hosts 162. Referring to FIG. 3, WAN optimizer 125 can include settings 350, and WAN optimizer 185 can include settings 352. Settings 350 include data used for one or more WAN optimizations performed by WAN optimizer 125. Settings 352 include data used for one or more WAN optimizations performed by WAN optimizer 185. In an embodiment, settings of a WAN optimizer are updated as the WAN optimizer receives the application traffic to be optimized. That is, settings 350 and settings 352 are updated "on-the-fly" as application traffic is processed. In such embodiment, there is some latency before achieving maximum optimization. For example, for deduplication, the more traffic processed by a WAN optimizer, the more efficient the deduplication will become.

In another embodiment, settings 350 and or settings 352 can be pre-populated prior to WAN optimization of given application traffic. For example, an administrator can configure a host 104 to perform a particular operation at a particular time, such as a VM migration at midnight. WAN optimizer 125 can autonomously obtain data for initializing one or more WAN optimizations of the application data prior to execution of the application (e.g., a VM migration). For example, host 104 can begin sending data to WAN optimizer 125 prior to the scheduled VM migration so that WAN optimizer 125 has at least partially pre-loaded data cache for deduplication when VM migration is triggered. As such, deduplication will be more efficient at the start of the VM migration. In another example, WAN optimizer 125 can interactively obtain data for initializing one or more WAN optimizations of the application data prior to execution of the application. For example, an administrator can pre-load WAN optimizer 125 with a data cache for use with deduplication prior to the VM migration. While deduplication has been described as an example, other types of WAN optimizations can also benefit from pre-populated settings prior to receiving the application traffic to be optimized. Other examples of the types of pre-loaded data that may benefit from WAN optimizations may include data-level pre-loading (such as VM migration, scheduled backup, disaster recovery machine state synchronization) or application-level caching (such as found in Active Directory® user synchronization, database replication, etc.) In general, settings 350 of WAN optimizer 125 can be pre-populated either autonomously or interactively prior to receiving the application traffic to be processed. The same process can be performed for settings 352 of WAN optimizer 185 within cloud data center 150.

Routing Optimization for Inter-Cloud Connectivity

In one or more embodiments, the above described techniques may be extended for use with inter-cloud connectivity between multiple cloud data centers in different sites, e.g., between a cloud data center 11-1 and a second cloud data center 11-2 shown in FIG. 1. Embodiments of the present disclosure are configured to make specific routing decisions, prune down the routing table such that traffic is encapsulated, which results in efficient routing operations. Embodiments provide a connectivity model between cloud data centers that are all on the same backbone network. Embodiments may perform route optimization on traffic between cloud data centers because the organization managing the cloud computing system has pre-determined all routes between the cloud data centers.

While traditional routing looks at a single field (e.g., destination network address) to make a routing decision, embodiments of the present disclosure are configured to make routing decisions per-flow and per-application. For example, gateways 184 may recognize that one workload comprised of a VM migration (between data centers) is being executed to the same destination as another workload comprised of a file operation. As a result, gateways 184 can make traffic classification between the organization managing the cloud computing system controls both the source and the destination and route the workloads differently between cloud data centers. In another example, specific algorithms for compression can perform better for certain types of data than other algorithms. While other traffic optimization approaches might use a particular algorithm (e.g., gzip) as a lowest common denominator, embodiments of the present disclosure selects specific algorithms based on the traffic type, the types of data being transmitted, and even the particular tenant for whom the data is for. Specific routing decision made for traffic of a VM migration, traffic for file transfer (e.g., Secure Copy Protocol), or traffic for a VPN connection from point A to point B, embodiments of the present disclosure use different prioritization from a classification perspective. That is, gateways 184 may prioritize routes for specific types of traffic.

Figure 8:
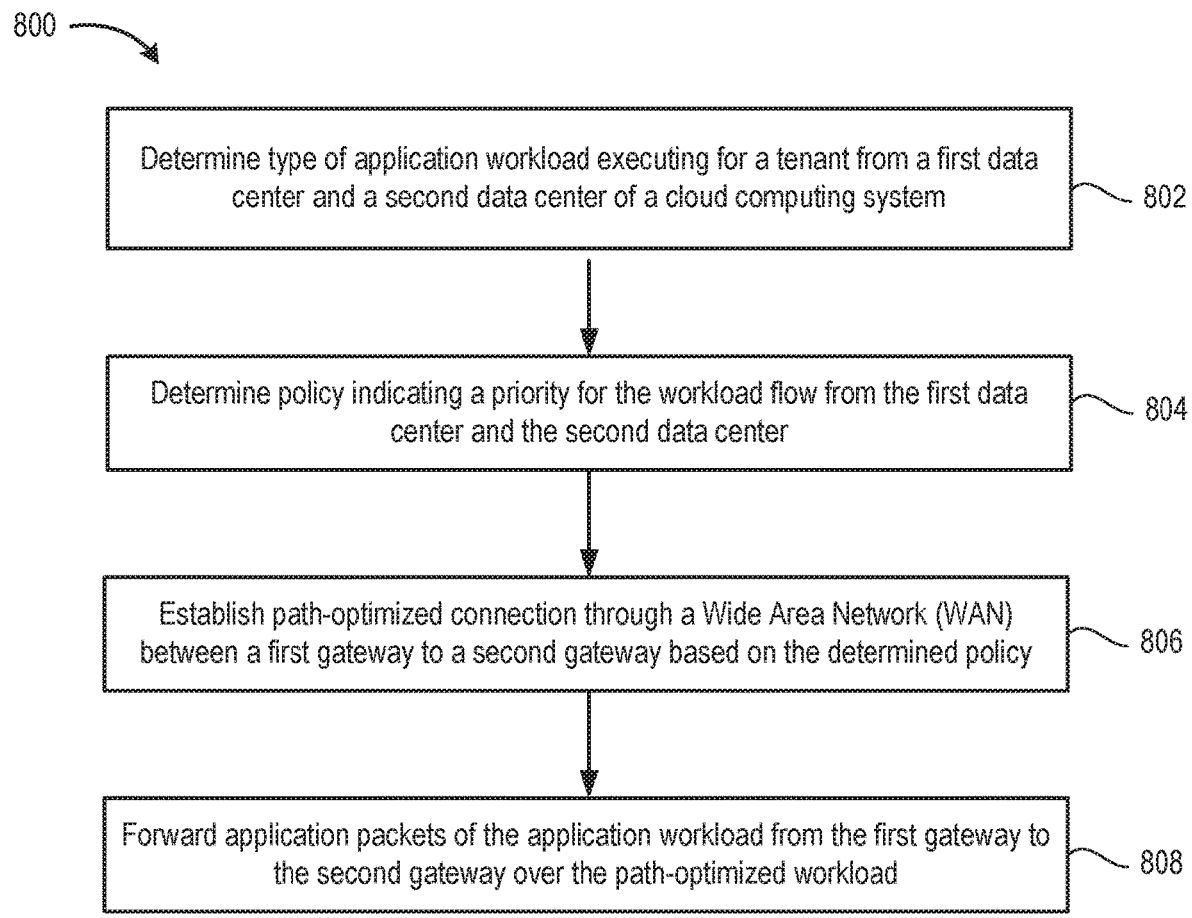
FIG. 8 is a flow diagram depicting a method of optimizing connectivity between data centers in a hybrid cloud computing system according to embodiments.

FIG. 8 is a flow diagram depicting a method 800 of optimizing connectivity between data centers in a hybrid cloud computing system according to embodiments. Method 800 can be performed by a gateway within a cloud data center (e.g., gateway 184), by a WAN optimizer, such as WAN optimizer 125, or other components.

At step 802, a first gateway 184 in a first cloud data center (e.g., 11-1) determines a type of an application workload flow executing for a tenant from the first data center and a second data center (e.g., 11-2) of the cloud computing system. Embodiments of the present disclosure route traffic comprised of a single macro flow with many micro flows. Based on the classification of the traffic, gateways 184 send the flows through higher priority or lower priority queues. Example types and classifications of application workload include file transfers, live VM migration, VPN, and voice and video data.

At step 804, gateway 184 determines a policy indicating a priority for the workload flow from the first data center and the second data center. For example, in cases where the type of application workload is a live migration of a VM from one data center to another, the gateway may use a policy indicating that the live migration workload has an elevated priority over other workloads, based on the latency requirements of the live migration process (e.g., prolonged latency has been known to cause the live migration process to fail). In some embodiments, gateway 184 determines the policy further based on the tenant associated with the workload flow (certain tenants may have elevated or lowered priority within the cloud computing system).

At step 806, the first gateway establishes a path-optimized connection through a wide area network (WAN) to a second gateway of the second data center for the application workload executing in the first data center based on the determined policy. As defined herein, "optimized" is meant to indicate that the preferred path is selected on the basis of the latency-relevant criteria set forth in this patent document. In some embodiments, the gateway probes the WAN with test packets to identify a plurality of paths between the first gateway and the second gateway by varying an IP flow tuple of the test packets across the set of IP flows, and selects an IP flow from the set of IP flows for the application. As discussed above. The gateway may establish a secure channel between the first gateway (e.g., 184-1) and the second gateway (e.g., 184-2) and encapsulate the WAN-optimized application packets within path-optimized packets according to the selected IP flow. The gateway may further be configured to encrypt the path-optimized packets for transmission over the secure channel. At step 808, the first gateway forwards application packets of the application workload flow from a first gateway of in the first data center to a second gateway in the second data center over the path-optimized connection.

Figure 9:
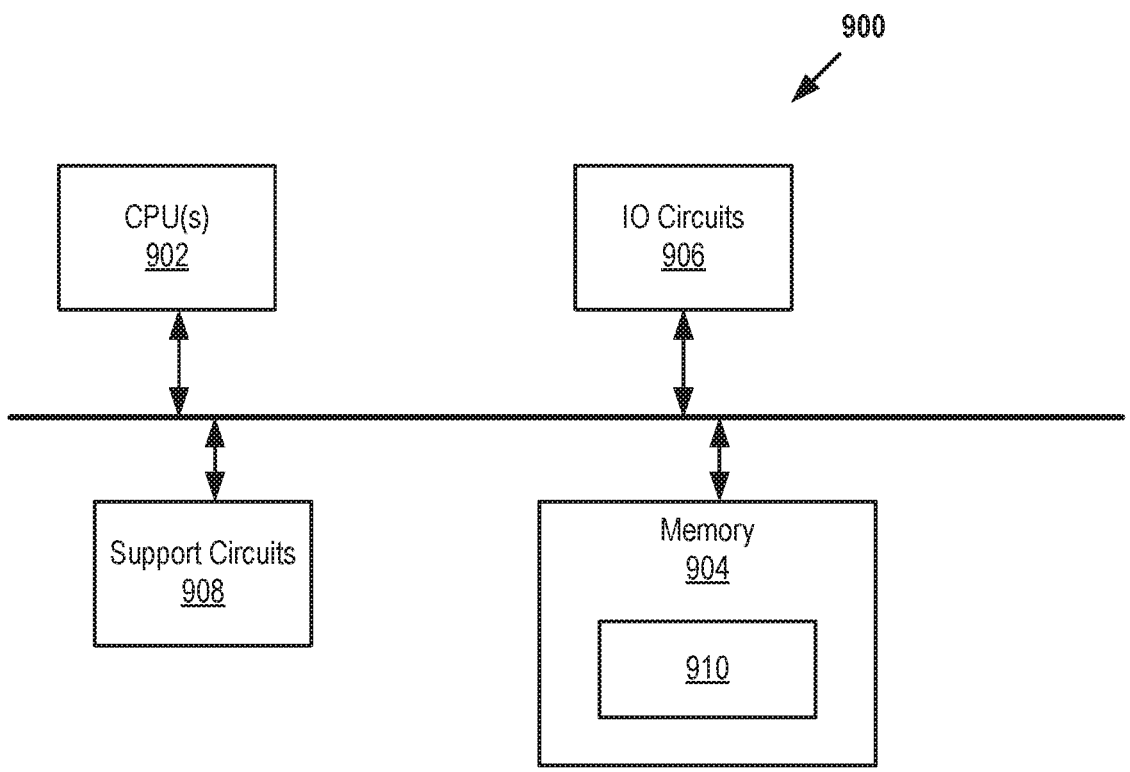
FIG. 9 is a block diagram depicting an example of a computer system in which one or more embodiments of the present disclosure may be utilized.

FIG. 9 is a block diagram depicting an example of a computer system 900 in which one or more embodiments of the present disclosure may be utilized. Computer system 900 can be used as a host to implement on-premise gateway 124, cloud gateway 184, or other gateway in a hybrid cloud computing system, as well as a WAN optimizer, such as WAN optimizer 125, WAN optimizer 185, or the like. Computer system 900 includes one or more central processing units (CPUs) 902, memory 904, input/output (IO) circuits 906, and various support circuits 908. Each of CPUs 902 can include any microprocessor known in the art and can execute instructions stored on computer readable storage, such as memory 904. Memory 904 can include various volatile and/or non-volatile memory devices, such as random access memory (RAM), read only memory (ROM), and the like. Instructions and data 910 for performing the various methods and techniques described above can be stored in memory 904 for execution by CPUs 902. That is, memory 904 can store instructions executable by CPUs 902 to perform one or more steps/sub-steps described above in FIGS. 4 and 6-8. Support circuits 908 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing connectivity between data centers in a cloud computing system, the method comprising:
    using a first gateway of a first data center of the cloud computing system, determining a type of an application workload flow executing for a tenant from the first data center of the cloud computing system and a second data center of the cloud computing system;
    using the first gateway of the first data center of the cloud computing system, determining a policy, which indicates an elevated or lowered priority over other workloads, for the application workload flow from the first data center and the second data center based on latency requirements associated with the type of the application workload flow, based on time of day and based on the tenant;
    using the first gateway of the first data center of the cloud computing system, establishing a path-optimized connection through a wide area network (WAN) between a first gateway of the first data center of the cloud computing system and a second gateway of the second data center of the cloud computing system for the application workload flow executing in the first data center based on the determined policy by varying an IP flow tuple of a plurality of test packets across a set of IP flows at the first gateway; and
    using the first gateway of the first data center of the cloud computing system, forwarding application packets of the application workload flow from the first gateway in the first data center of the cloud computing system to the second gateway in the second data center of the cloud computing system over the path-optimized connection.

2. The method of claim 1, wherein the type of the application workload flow is a live virtual machine migration from a virtual machine executing in the first data center to the second data center, wherein the determined policy comprises an elevated priority of the application workload flow over other workloads.

3. The method of claim 1, wherein the type of the application workload flow comprises at least one of a file transfer operation, a virtual private network connection, voice data, and video data.

4. The method of claim 1, wherein the step of establishing the path-optimized connection comprises:
   probing the WAN with test packets to identify a plurality of paths between the first gateway and the second gateway; and
   selecting an IP flow from the set of IP flows for the application.

5. The method of claim 4, wherein the step of establishing the path-optimized connection comprises:
   establishing a secure channel between the first gateway and the second gateway;
   encapsulating WAN optimized application packets from a WAN optimizer within path-optimized packets according to the selected IP flow at the first gateway; and
   encrypting the path-optimized packets for transmission over the secure channel.

6. A non-transitory computer-readable storage medium comprising instructions that, when executed in a computing device, provide connectivity between data centers in a cloud computing system, by performing the steps of:
   using a first gateway of a first data center of the cloud computing system, determining a type of an application workload flow executing for a tenant from the first data center of the cloud computing system and a second data center of the cloud computing system;
   using the first gateway of the first data center of the cloud computing system, determining a policy, which indicates an elevated or lowered priority over other workloads, for the application workload flow from the first data center and the second data center based on latency requirements associated with the type of the application workload flow, based on time of day and based on the tenant;
   using the first gateway of the first data center of the cloud computing system, establishing a path-optimized connection through a wide area network (WAN) between a first gateway of the first data center of the cloud computing system and a second gateway of the second data center of the cloud computing system for the application workload flow executing in the first data center based on the determined policy by varying an IP flow tuple of a plurality of test packets across a set of IP flows at the first gateway; and
   using the first gateway of the first data center of the cloud computing system, forwarding application packets of the application workload flow from the first gateway in the first data center of the cloud computing system to the second gateway in the second data center of the cloud computing system over the path-optimized connection.

7. The non-transitory computer-readable storage medium of claim 6, wherein the type of the application workload flow is a live virtual machine migration from a virtual machine executing in the first data center to the second data center, wherein the determined policy comprises an elevated priority of the application workload flow over other workloads.

8. The non-transitory computer-readable storage medium of claim 6, wherein the type of the application workload flow comprises at least one of a file transfer operation, a virtual private network connection, voice data, and video data.

9. The non-transitory computer-readable storage medium of claim 6, wherein the step of establishing the path-optimized connection comprises:
   probing the WAN with test packets to identify a plurality of paths between the first gateway and the second gateway; and
   selecting an IP flow from the set of IP flows for the application.

10. The non-transitory computer-readable storage medium of claim 9, wherein the step of establishing the path-optimized connection comprises:
    establishing a secure channel between the first gateway and the second gateway;
    encapsulating WAN optimized application packets from a WAN optimizer within path-optimized packets according to the selected IP flow at the first gateway; and
    encrypting the path-optimized packets for transmission over the secure channel.

11. A computer system for provide connectivity between data centers in a cloud computing system, the computer system comprising a system memory and a processor programmed to:
    using a first gateway of a first data center of the cloud computing system, determine a type of an application workload flow executing for a tenant from the first data center of the cloud computing system and a second data center of the cloud computing system;
    using the first gateway of the first data center of the cloud computing system, determine a policy, which indicates an elevated or lowered priority over other workloads, for the application workload flow from the first data center and the second data center based on latency requirements associated with the type of the application workload flow, based on time of day and based on the tenant;
    using the first gateway of the first data center of the cloud computing system, establish a path-optimized connection through a wide area network (WAN) between a first gateway of the first data center of the cloud computing system and a second gateway of the second data center of the cloud computing system for the application workload flow executing in the first data center based on the determined policy by varying an IP flow tuple of a plurality of test packets across a set of IP flows at the first gateway; and
    using the first gateway of the first data center of the cloud computing system, forward application packets of the application workload flow from the first gateway in the first data center of the cloud computing system to the second gateway in the second data center of the cloud computing system over the path-optimized connection.

12. The computer system of claim 11, wherein the type of the application workload flow is a live virtual machine migration from a virtual machine executing in the first data center to the second data center, wherein the determined policy comprises an elevated priority of the application workload flow over other workloads.

13. The computer system of claim 11, wherein the type of the application workload flow comprises at least one of a file transfer operation, a virtual private network connection, voice data, and video data.

14. The computer system of claim 11, wherein the processor configured to establish the path-optimized connection is further configured to:
    probe the WAN with test packets to identify a plurality of paths between the first gateway and the second gateway; and select an IP flow from the set of IP flows for the application.

15. The computer system of claim 11, wherein the processor configured to establish the path-optimized connection is further configured to:
   establish a secure channel between the first gateway and the second gateway;
   encapsulate WAN optimized application packets from a WAN optimizer within path-optimized packets according to the selected IP flow at the first gateway; and
   encrypt the path-optimized packets for transmission over the secure channel.

16. The method of claim 1, wherein the IP flow tuple comprises a source IP address, a source port, a destination IP address and a destination port.

* * * * *